US011323253B2

(12) United States Patent
Tschache et al.

(10) Patent No.: US 11,323,253 B2
(45) Date of Patent: May 3, 2022

(54) METHOD AND DEVICE FOR GENERATING CRYPTOGRAPHIC KEYS ACCORDING TO A KEY DERIVATION FUNCTION MODEL AND VEHICLE

(71) Applicant: Volkswagen Aktiengesellschaft, Wolfsburg (DE)

(72) Inventors: Alexander Tschache, Wolfsburg (DE); Timo Winkelvos, Sickte (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 6 days.

(21) Appl. No.: 17/003,865

(22) Filed: Aug. 26, 2020

(65) Prior Publication Data
US 2021/0067333 A1 Mar. 4, 2021

(30) Foreign Application Priority Data
Aug. 28, 2019 (DE) ...................... 10 2019 212 958.7

(51) Int. Cl.
*H04L 9/08* (2006.01)
*H04L 9/14* (2006.01)
*G06F 21/60* (2013.01)

(52) U.S. Cl.
CPC ............. *H04L 9/0866* (2013.01); *H04L 9/14* (2013.01); *G06F 21/602* (2013.01); *H04L 2209/84* (2013.01)

(58) Field of Classification Search
CPC ..... H04L 9/0866; H04L 9/14; H04L 2209/84; H04L 9/08; H04L 9/16; H04L 9/0894; G06F 21/602
See application file for complete search history.

(56) References Cited

U.S. PATENT DOCUMENTS 8,380,978 B2   2/2013   Kuhls et al. ................. 713/153
9,479,329 B2   10/2016   Geiger et al.
(Continued)

FOREIGN PATENT DOCUMENTS

DE   102007058975 A1   6/2009   .............. H04L 9/06
DE   102011014688 B3   3/2012   ........... B60R 16/023
(Continued)

OTHER PUBLICATIONS

Extended European Search Report, Application No. 20192775.3, 7 pages, dated Dec. 23, 2020.
(Continued)

*Primary Examiner* — Abiy Getachew
(74) *Attorney, Agent, or Firm* — Slayden Grubert Beard PLLC

(57) ABSTRACT

The invention relates to a method for generating cryptographic keys according to a key derivation function model. An embodiment includes the following steps: defining a master key for different models of a product type from a manufacturer; defining a set of key derivation parameters for the key derivation function model; determining the key derivation parameters for the model for which a cryptographic key is to be derived; deriving a single cryptographic key or a set of cryptographic keys from the master key according to the key derivation function model taking into account the key derivation parameters, wherein the step of defining a set of key derivation parameters comprises at least the following parameters: key type identification and key type learning counter.

20 Claims, 5 Drawing Sheets

(56) References Cited

U.S. PATENT DOCUMENTS

| | | | |
|---|---|---|---|
| 2010/0098243 A1 | 4/2010 | Chopart | .......................... 380/28 |
| 2017/0111178 A1* | 4/2017 | Winkelvos | ........ H04W 12/0431 |
| 2017/0244566 A1 | 8/2017 | Tschache | |
| 2019/0394034 A1* | 12/2019 | Aschauer | .............. H04L 9/0877 |

FOREIGN PATENT DOCUMENTS

| | | | | |
|---|---|---|---|---|
| EP | 2629450 A2 | 8/2013 | ............... | H04L 9/06 |
| EP | 3157281 A1 | 4/2017 | ............... | H04L 9/08 |
| EP | 3321892 A1 | 5/2018 | ............... | G07C 9/00 |
| EP | 3425867 A1 | 1/2019 | ............... | H04L 29/06 |
| EP | 3499792 A1 | 6/2019 | ............... | G06F 21/57 |
| WO | 2019/004097 A1 | 1/2019 | ............... | H04L 9/08 |

OTHER PUBLICATIONS

German Office Action, Application No. 102019212958.7, 8 pages, dated Jul. 14, 2020.

* cited by examiner

| KURQID | MKR | IDC | KID | KIDUC | KIDUR | VIN | ECUIN |

FIG. 5

METHOD AND DEVICE FOR GENERATING CRYPTOGRAPHIC KEYS ACCORDING TO A KEY DERIVATION FUNCTION MODEL AND VEHICLE

CROSS-REFERENCE TO RELATED APPLICATIONS

This application claims priority to German Patent Application No. DE 10 2019 212 958.7, filed on Aug. 28, 2019 with the German Patent and Trademark Office. The contents of the aforesaid Patent Application are incorporated herein for all purposes.

TECHNICAL FIELD

The invention relates to a method and to a device for generating cryptographic keys according to a key derivation function model and to a correspondingly equipped vehicle.

BACKGROUND

This background section and the following summary section is provided for the purpose of generally describing the context of the disclosure. Work of the presently named inventor(s), to the extent the work is described in the background section or the summary section, as well as aspects of the description that may not otherwise qualify as prior art at the time of filing, are neither expressly nor impliedly admitted as prior art against the present disclosure.

The invention relates to the field of data security in the digital age. Various techniques for encryption and for secure data exchange are known from the technical field of cryptography. The main goals for protection of data stocks are confidentiality (protection against access), integrity (protection against change), authenticity/protection against forgery and liability (non-deniability).

SUMMARY

The invention is explained by using the example of a system for the provision of generic keys in the context of vehicles. The keys that are provided relate to cryptographic keys.

There are the following requirements of a system for provision of generic keys: first of all, it should be made possible that not all keys have to be stored individually. There is also the requirement that keys are unique. The keys should differ in relation to the vehicles, but also in relation to the control devices and/or in relation to the control device groups. Keys of different functions should also be completely different. It should be possible to effectively change the keys, whereby the new keys also have to be completely distinguishable.

There is the approach of entirely relying on asymmetric cryptography and on using asymmetric keys. However, this approach has some disadvantages:

It results in a growing key database (for tracking) making corresponding requirements on confidentiality. The growing key database results from simply generally generating the keys as random numbers (the standard way). Since therefore as few keys as possible should be generated, the number of keys should be reduced (either via the number of keys or fewer updates of the keys), which reduces flexibility.

There is no easy way to generate or track versions of key sets for the vehicle. Further, asymmetric cryptography is slow, expensive, memory-intensive and leads to enormous complexity in production and subsequent maintenance.

However, with symmetric cryptography there is a problem that the same keys must also be notified to the respective backend server, from which for example also the dealers and workshops have to obtain the keys, if necessary. For example, this is required when the vehicle is sold. There are different regulations in the respective countries, which may result in a updating the keys in the case of a change of the country or of the region. There are countries that require the keys to be disclosed to government authorities. Therefore it is necessary to renew the keys when selling to a different region/country. Keys are required for various purposes in vehicles. It's not just about opening and closing the vehicle. Currently, keys are already assigned to individual control devices. Several functions that require their own key may even be implemented in one single control device. For that matter, the same cryptographic key may also be used in several control devices. For example, this may be useful for communication between the control devices as well as for external communication. Thus, already today around 50 different keys may be provided for a modern vehicle. Saving all of this for each individual vehicle is associated with an increased effort. To solve this problem, the concept of key derivation function has been developed. This concept provides for so-called master keys to be distributed to the various backend servers. For each vehicle it is additionally stored in the backend server which types of key are present in which control devices. In addition, vehicle-specific features are stored. This is required for derivation of vehicle-specific keys during the key derivation function, which keys differ from vehicle to vehicle. There is a generic vehicle-independent key generation method in which the vehicle-specific features are considered. With this information, the keys for the individual vehicle may be generated again and again.

An object exists to provide an improved key management system which may fulfill the extended list of tasks of a large corporation with worldwide locations and vehicle fleets.

A large corporation that manufactures and sells vehicles provides for example any or all of the following requirements to a key management system:

The keys of the individual vehicles should be different.

Differently defined key types should be different.

In the case of a renewal of keys the new keys should be completely different from the previous keys in the same vehicle.

The new keys that are assigned to control devices should also be completely different from the previous keys in the same control device or in the control device network.

The keys of a secure communication network are the same (n control devices may use the same key for communication with one another); this also applies after these keys have been renewed, whereby the new key should also differ from the previous key.

By reading out the metadata (key type identifier and key type learning counter), it should not be possible to calculate the current key without knowing the parent keys, even if the previous key is known.

Conversely, in the case of the parent key and the metadata of the vehicle being known, it should be possible to derive all keys again so that they do not have to be permanently stored in the backend. The metadata itself is not confidential, only the master key and any parent keys are confidential, so that the database in which the metadata is stored does not have to meet increased security requirements, for example the need to make backups.

The above and other objects are achieved by a method for generating cryptographic keys according to a key derivation function model, a device for generating cryptographic keys according to a key derivation function model, and a vehicle according to the independent claims. Embodiments of the invention are discussed in the dependent claims.

The details of one or more embodiments are set forth in the accompanying drawings and the description below. Other features will be apparent from the description, drawings, and from the claims.

BRIEF DESCRIPTION OF THE DRAWINGS

In the FIGS.:

FIG. 5 shows an exemplary format of a request message which is sent to the backend server by the vehicle for requesting new keys when a control device is exchanged.

DESCRIPTION

Figure 1:
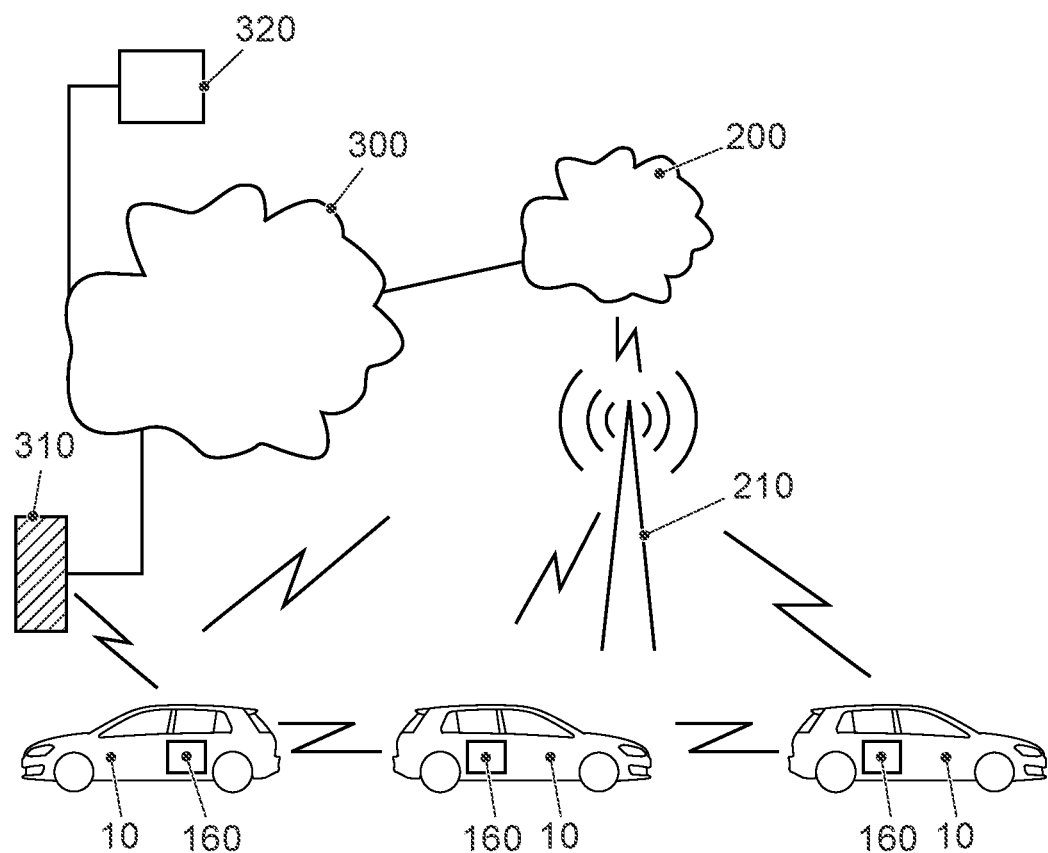
FIG. 1 shows the basic architecture of a system for mobile radio-based communication in the vehicle according to an embodiment.

Specific embodiments of the invention are described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

A solution according to an exemplary first aspect provides in a first variant a method for generating cryptographic keys according to a key derivation function model, in which the following steps are carried out:

defining a master key for different models of a product type of a manufacturer;
defining a set of key derivation parameters for the key derivation function model;
determining of the key derivation parameters for the model for which a cryptographic key is to be derived;
deriving an individual cryptographic key or a set of cryptographic keys from the master key according to the key derivation function model, wherein the key derivation parameters are taken into account, wherein the step of defining a set of key derivation parameters comprises at least the parameters of: key type identification and key type learning counter.

The use of the key derivation model, according to which individual cryptographic keys or a whole set of cryptographic keys may be derived from a master key, offers the benefit that a large number of very confidential cryptographic keys no longer has to be distributed to the various locations where the keys are needed and has to be securely stored there. For a large corporation having very large numbers of products this may result in the reduction of an immense effort. For example in the Applicant's group, 10 million vehicles are produced per annum. For one single vehicle currently around 50 different keys are required. This trend is increasing and in future a significantly higher number of keys may be required. If, instead of the cryptographic keys, only the master keys have to be stored in the manufacturer's back-end server, this effort is reduced by multiple times. Further, several different keys may be derived from one single master key. Master keys may be required for the various vehicle models, separated by brand and country of distribution or sale. However, this number is then limited to a few dozen master keys. The fact that the key derivation parameters contain a key type identification and a key type learning counter offers the benefit that, even when knowing the previous key, the current keys cannot be calculated without knowing the master key or an intermediate parent key, even if "hackers" should manage to get to the key type ID and the key type learning counter by reading out the metadata. However, the master key as well as an intermediate parent key are not stored in the vehicle, but are only securely stored on the backend server. For that matter, the previous key is the key that was previously used in the vehicle for the corresponding purpose and is now being renewed. A parent key may be a key that derives itself from the master key, from which one or more cryptographic keys are derived.

Conversely, if the master key or the parent key and the metadata of the vehicle are known, the keys may be derived again so that they do not have to be permanently and securely stored in the backend server. In fact, the metadata of the keys do not necessarily have to be protected (However, the master and parent keys have to be protected!), so that a database comprising the metadata does not have any increased security requirements, such as the need for regular backups.

In some embodiments of the method it is provided that the step of defining a set of key derivation parameters also includes one or more of the parameters serial number of the product type, one or more keys need to be renewed, and identity counter. The identity counter has the meaning of a counter that is valid for the group of keys of the product. It is noted that, strictly speaking, it may be exactly one instance of a product. Theoretically, several instances may be provided in a product, each of which has its own set of key derivation parameters with identity counter. By increasing this identity counter by one and in some embodiments, it may be achieved that all keys of the key group are changed during key derivation. This enables special applications such as:

a) the import/export of products to countries with different legal requirements for cryptography;

b) in the case of the product being a vehicle, for data protection reasons it may be necessary in the future to change the keys when a vehicle is sold, which is easy to be realized.

By inclusion of the serial number, the derived keys may be individualized for the product sold. If the product is a vehicle, for example the vehicle identification number (German FIN or English VIN) may be used for this purpose.

The parameter "need for renewal" is also of interest, which may facilitate replacement of a control device in the product. In this case and in some embodiments, all key-type learning counters of the keys, which in the control devices are marked as to be renewed, are increased, such that these are also renewed during key derivation for the new control device. This has the benefit that the same key also changes in the other control devices. In this manner invasive attack scenarios are made useless, in which scenarios the hardware of control devices is destroyed in order to release keys from protected memory areas, since these keys become worthless as soon as the control device is replaced.

In some embodiments, a reference to the master key, from which the cryptographic keys are derived, is stored in the product. Thus, the reference may be transferred by a message to the point of derivation of the keys.

In some embodiments, the method may be used in a beneficial manner if the product is a vehicle. Modern vehicles are equipped with a number of control devices, some of which use their own keys. Therefore, many different keys have to be stored in vehicles. In the case of vehicles and in some embodiments, the type of control device is included in the key derivation as a further parameter of key derivation.

In some embodiments, for key management it is beneficial if the master keys for the vehicles of a manufacturer differ according to one or more of the criteria brand of vehicle, model of vehicle, year of manufacture and distribution country or distribution/sales region. In doing so not all key sets have to be managed in each data center of the various service providers.

For the import of the derived keys into the vehicle it is beneficial in some embodiments if the derived key or the set of the derived keys together with the master key reference and the status of the identity counter may be downloaded by a download link container, after the key derivation in a backend server of a crypto service provider or the manufacturer. If there is internet connectivity, the product may then download the download link container via a secure connection.

Separate download link containers may be provided for different control devices of the product in some embodiments. This increases security and facilitates handling of the downloaded download link container in the product.

In some embodiments, the properties of the key and the derivation path are determined by the key type, identified by the key type identification. In this case the derivation path indicates from which master key which intermediate parent key is derived and which cryptographic key in turn is derived from which parent key.

Within the method of this aspect, it is assumed that there is a secure process for data entry into the back-end systems, which process enables keys to be imported into the back-end systems without compromising the confidentiality of these keys. This process is used to import the (domain) master key into the service centers distributed around the world.

For a device for generating cryptographic keys according to another aspect and corresponding to the method according the preceding aspect, it is beneficial if the device contains a key derivation circuit for derivation of the cryptographic key from a stored master key. The stored master key is selected in a received message by a master key reference specified therein. In doing so the key derivation is carried out according to a key derivation model, in which a set of key derivation parameters is entered. Said set of key derivation parameters includes at least the key type identification and the key type learning counter.

In some embodiments, the device is designed in such a way that for key derivation it furthermore considers one or more of the following key derivation parameters: serial number of the product type, need of one or more keys to be renewed, identity counter.

In another aspect, the present disclosure relates to a vehicle which is equipped with at least one processing unit, the processing unit having a protected memory area in a memory in which at least one cryptographic key is stored. In some embodiments, the processing unit has another memory area in which at least one master key reference and a set of key derivation parameters are stored, comprising at least the identity counter of the key derivation parameter with respect to a state of the vehicle key.

The various embodiments of the aspects mentioned in this application may be combined with one another in a beneficial manner, unless otherwise stated in the individual case.

In the following, the invention is explained by exemplary embodiments with reference to the accompanying drawings.

The present description illustrates some principles of the invention. It is therefore understood that those skilled in the art will be able to design various arrangements which, although not explicitly described herein, embody the principles of the invention and are also considered to be encompassed by the scope of the invention.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

With the advent of modern communication technology in the vehicles of the future, vehicles are increasingly developing into communication centers from which many kinds of services may be used. In doing so, more and more additional services offered by the manufacturer of the vehicle are being integrated into the vehicles. Examples of such services are navigation services, security services such as accident warning messages and breakdown calls, remote control services for programming the charging processes of electric vehicles, air conditioning, retrieval of vehicle data and the location of the vehicle, etc. The garages may also be integrated and vehicles may be called into the garage, for example in the case of product recalls. In the meantime there is also the possibility of improving some software implemented functions of the vehicle from time to time, which may be done by software updates. Actually, this often happens in the garage. In the future, however, this will increasingly also be done online, that means via a download from a server on the Internet, which is also referred to as download over the air (OTA). Such services, as well as the software update process, must be secured with keys. For that matter, cryptographic keys are not only used for the processes relating to access to online services, but also for the purpose of theft protection (access to the vehicle) and to activate other functions that are already set up in the vehicle's control devices, for access to diagnostics data and accident data, etc.

In a first instance FIG. 1 shows the architecture of an exemplary system for vehicle communication by means of mobile communication. Reference number 10 denotes a vehicle. The vehicle shown is designed as a passenger car. This is not intended to be limiting; it may be any type of vehicle. Examples of other vehicle types are: commercial vehicles, in particular trucks, buses, motorcycles, bicycles, scooters, camping vehicles, agricultural machines, construction machinery, rail vehicles, etc. The use of the present disclosure would generally be possible in land vehicles, rail vehicles, watercraft and aircraft including robots and drones. The vehicle 10 is equipped with an on-board communication circuit 160 comprising a corresponding antenna unit, so that it may participate in the various types of vehicle communication as vehicle-to-vehicle (V2V) and as vehicle-to-everything (V2X). FIG. 1 shows that the vehicle 10 may communicate with the mobile phone base station 210 of a mobile radio provider.

Such a base station 210 may be an eNodeB base station of an LTE mobile radio provider (Long Term Evolution). The base station 210 and the corresponding equipment is part of a mobile radio communication network comprising multiple mobile radio cells, each cell being served by a base station 210.

The base station 210 is positioned near a main road on which the vehicles 10 travel. In LTE terminology, a mobile terminal corresponds to a user equipment UE which enables a user to access network services, wherein the user connects to the UTRAN or the Evolved UTRAN via the radio interface. Typically, such user equipment corresponds to a smartphone. Such mobile terminals are used by the passengers in the vehicles 10. In addition, the vehicles 10 are each equipped with an on-board communication circuit 160. This on-board communication circuit 160 corresponds for example to an LTE communication circuit by which the vehicle 10 may receive mobile data (downlink) and may send such data in the uplink direction (uplink). This on-board communication circuit 160 may also be equipped with a WLAN p circuit in order to be able to participate in an ad-hoc V2X communication mode.

With regard to the LTE mobile radio communication system, the Evolved UMTS Terrestrial Radio Access Network E-UTRAN of LTE consists of several eNodeBs that provide the E-UTRA user level (PDCP/RLC/MAC/PHY) and the control level (RRC). The eNodeBs are connected to one another via the so-called X2 interface. The eNodeBs are also connected to the EPC (Evolved Packet Core) 200 via the so-called S1 interface.

From this general architecture, FIG. 1 shows that the base station 210 is connected to the EPC 200 via the S1 interface and that the EPC 200 is connected to the internet 300. A back-end server 320, to which the vehicles 10 may send and receive messages, is likewise connected to the internet 300. Finally, a road infrastructure station 310 is also shown. This may be illustrated, for example, by a street-side unit, which in technical jargon is often referred to as a road-side unit RSU 310. To simplify the implementation, it is assumed that all components have been assigned an internet address, typically in the form of an IPv6 address, so that the packets that transport messages between the components may be routed accordingly. The various interfaces mentioned are standardized. In this regard, reference is made to the corresponding LTE specifications that are published.

Concerning the key management system to be described in more detail, the basic principle is that from the vehicles side, a new key set is requested from the backend server 320, wherein the vehicle does not send any actual key data to the backend server 320, but rather wherein the respective backend server 320 only receives a reference concerning a master key with additional information about the key status or key states from which he may derive the actual key or keys. The keys newly generated in the backend are transmitted to the vehicle and are safely entered into the vehicle 10. This mostly happens in a garage environment. A computer (diagnostic computer) may be connected to the vehicle 10, via which the key exchange process is operated. The backend server 320 may be positioned in a computer center of the vehicle manufacturer or also with a crypto service provider who is commissioned by the manufacturer for this purpose.

During the production of the vehicle 10, all keys required to access the various services to which it is authorized are compiled and programmed into the vehicle 10.

Figure 2:
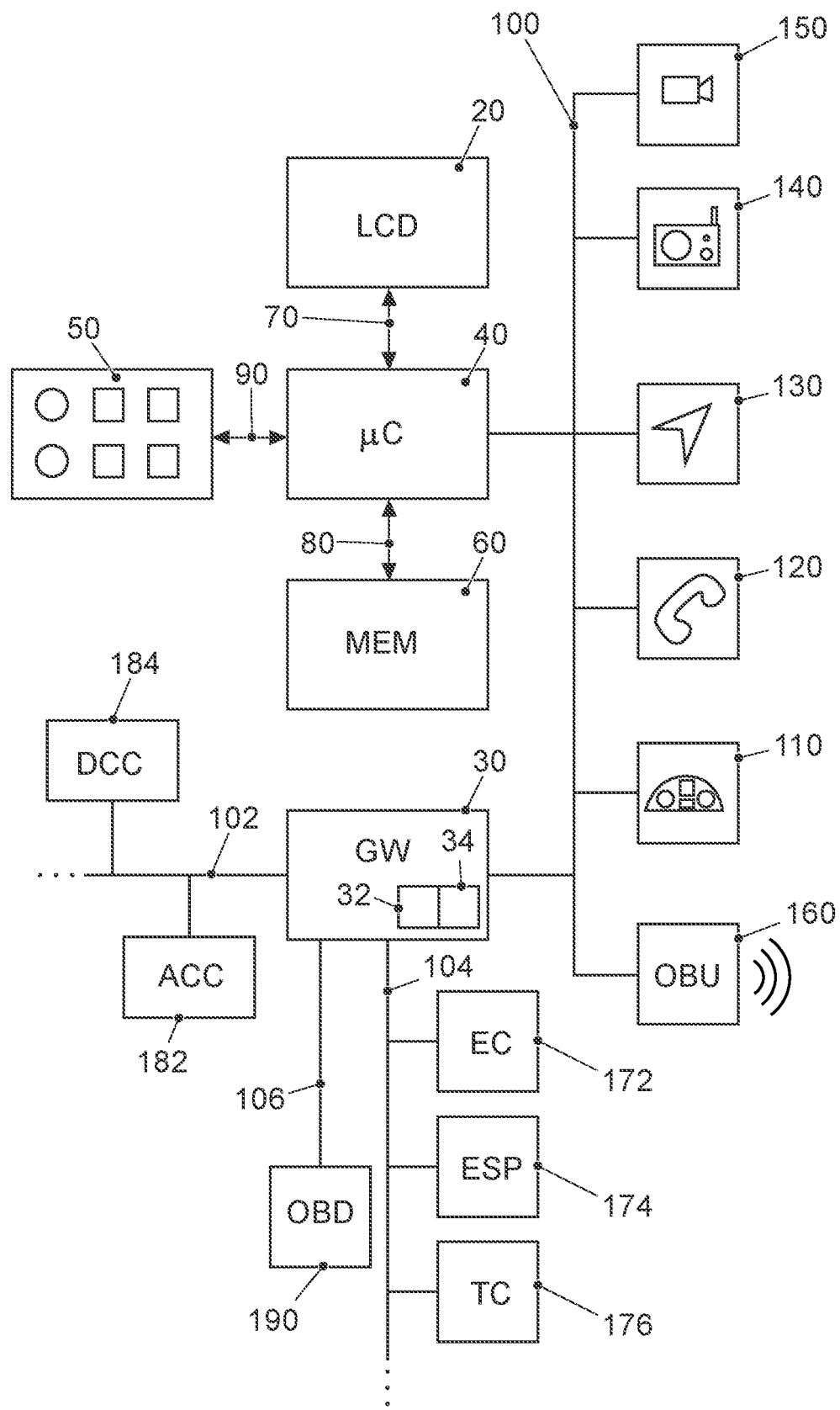
FIG. 2 shows a block diagram of the on-board electronics of a vehicle according to an embodiment.

First, an example of the on-board electronics of a vehicle is shown in FIG. 2. This includes an infotainment system. In the case of motor vehicles, especially cars, an infotainment system refers to the combination of car radio, navigation system, hands-free system, driver assistance systems and other functions in a central operating unit. The term infotainment is a portmanteau word made up of the words information and entertainment. The infotainment system comprises the components that are connected to the bus line 100. A computing device 40, the touch-sensitive display unit 20, an input unit 50 and a memory 60 are part of these components. The display unit 20 comprises both a display area for displaying variable graphic information and a user interface (touch-sensitive layer) arranged above the display area for entering commands by a user.

The display unit 20 is connected to the computing device 40 via a data line 70. The data line may be designed according to the LVDS standard, corresponding to low voltage differential signaling. The display unit 20 receives control data for controlling the display surface of the touch-screen 20 from the computing device 40 via the data line 70. Control data of the commands entered are also transmitted from the touchscreen 20 to the computing device 40 via the data line 70. The input unit 50 includes the control elements already mentioned, such as buttons, rotary controls, slide controls or rotary push-button controls, with the aid of which the operator may make inputs via the menu guidance. Input is generally understood to mean the selection of a selected menu option, as well as changing a parameter, switching a function on and off, etc.

The memory device 60 is connected to the computing device 40 via a data line 80. A pictogram directory and/or symbol directory with the pictograms and/or symbols for the possible insertion of information on the display unit 20 is stored in the memory 60.

The other parts of the infotainment system in form of camera 150, radio 140, navigation device 130, telephone 120 and instrument cluster 110 are connected to the device for operating the infotainment system via the data bus 100. The high-speed variant of the CAN bus according to ISO standard 11898-2 may be used as the data bus 100. Alternatively, for example the use of a bus system based on Ethernet technology such as IEEE 802.03cg could also be considered. Bus systems in which data is transmitted via fiber optic cables may also be used. Examples are the MOST bus (Media Oriented System Transport) or the D2B bus (Domestic Digital Bus). It is also mentioned here that the camera 150 may be designed as a conventional video camera. In this case, it records 25 frames per second, which corresponds to 50 fields per second in the interlace recording mode. Alternatively, a special camera may be used that records more images per second in order to increase the accuracy of the object recognition for faster moving objects. Several cameras may be used to monitor the surroundings. In addition, RADAR or LIDAR systems, corresponding to Radio Detection and Ranging and Light Detection and Ranging, could also be used in addition or as an alternative in order to carry out or expand the monitoring of the surroundings. The vehicle 10 is equipped with a communication circuit 160 for wireless internal and external communication. This circuit is often referred to as an on-board unit. It may be used for mobile communication, for example it may be designed according to LTE standard, corresponding to Long Term Evolution. It may also be designed for WLAN communication, corresponding to wireless LAN, be it for communication with devices of the occupants in the vehicle or for vehicle-to-vehicle communication, etc.

The communication bus 100 of the infotainment system is connected to a gateway 30. The other parts of the vehicle electronics are also connected therewith. On the one hand, the communication bus 104 of the drive train, which is typically implemented in the form of the CAN bus. The control devices of the drive train, engine control device 172, ESP control device 174 and transmission control device 176 are named and shown as examples. Furthermore, the communication bus 102 for driver assistance systems, which may be designed in the form of the FlexRay bus. Two driver assistance systems are shown here: a driver assistance system 182 for automatic distance control ACC corresponding to Adaptive Cruise Control, and a control device 184 for automatic setting of the chassis. A communication bus 106 connecting the gateway 30 to an on-board diagnostic interface 190 is also connected to the gateway 30. The task of the gateway 30 is to do the format conversions for the various communication systems 100, 102, 104, 106 so that data may be exchanged with one another.

Figure 3:
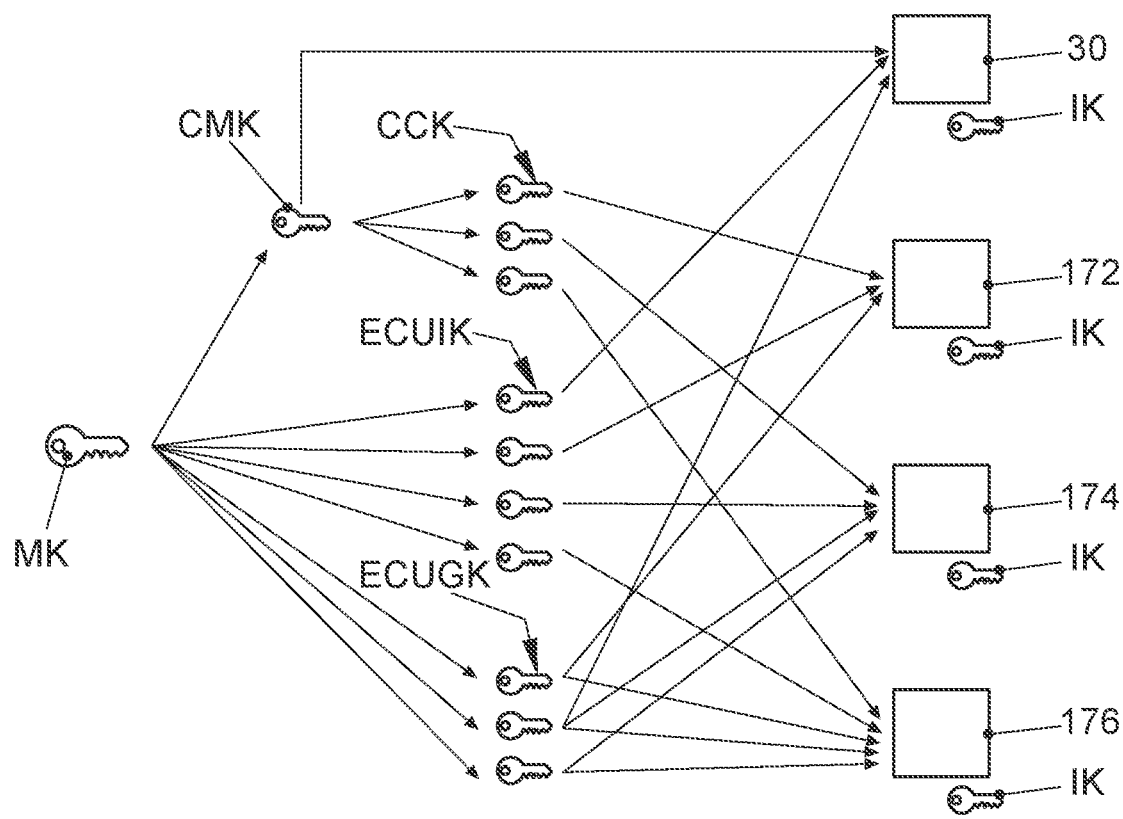
FIG. 3 shows the principle of key derivation from a master key in the process of key renewal for certain control devices of a vehicle according to an embodiment.

FIG. 3 shows an example of the general principle of key derivation of a set of cryptographic keys for the vehicle 10 from a master key MK. Two types of keys may be derived from this. Keys that are individual for each control device and keys that are distributed to several control devices within a vehicle. The derived keys may also be derived for other components of a vehicle, such as other processing units and other components of the infotainment system.

Several keys are shown which are assigned to the control devices 30, 172, 174, 176 of the vehicle. FIG. 2 is shown in simplified form. In a practical implementation, the other control devices 182, 184 and the components of the infotainment system would also be supplied with their own keys. In this example, the gateway 30 serves as a master control device for communication and/or encryption. It has a memory with two different memory areas. The cryptographic keys required by the gateway are stored in the specially protected memory area 32. A master key reference (MKR) and a set of key derivation parameters (MKR, IDC, KID, KIDUC, KIDUR, VIN, ECUIN) are stored in the other memory area 34. The data stored there may be transmitted to the backend server 320, as will be explained in more detail below. The master control device may act as a vehicle-internal cryptography unit for signing symmetrical keys for other control devices of the vehicle or as a time master for a CAN bus 104. It is also possible for each control device to contain its own control device-internal cryptography unit.

Each control device contains an initial key IK that is introduced by the supplier or manufacturer of the control device. The initial key IK is used to encrypt and sign the download link container when the control device is initially loaded. During the data entry process, it may be replaced by a key specially designed for this control device. This may then be used to encrypt and sign all other key data records and for other administrative functions that affect the control device with regard to the circle of trust.

The entry of data is supplied by the supplier in a protected environment, so that the initial key IK is prevented from becoming known.

From the vehicle manufacturer's point of view, a master key MK is first generated. The master key MK is stored in a database of the manufacturer's back-end server 320. The other keys for all vehicles or for a group of vehicles are derived from this master key MK.

Master keys may be assigned for different economic sectors based on one or more of the criteria vehicle brand, vehicle model, year of manufacture and distribution country/sales country or distribution/sales region.

A master communication key CMK is derived from the master key MK. It serves to use a common key for communication with the various control devices and other components of the vehicle, such that the master control device 30 may communicate with the other components in a protected manner.

For the communication between the control devices, further communication keys CCK for the control devices 30, 172, 174, 176 may be derived from the master communication key CMK and distributed to the control devices 30, 172, 174, 176.

Further individual keys for the control devices 30, 172, 174, 176 are generated from the master key MK. Such a key ECUIK is only known to this one control device in the vehicle. Individual keys may also be derived for individual functions of the control devices. Every function that requires such a key receives its own key ECUIK. For example, the keys may be created with a length of 256 bits so that they are still considered secure in the future. The AES procedure, corresponding to the Advanced Encryption Standard, is used for the encryption algorithm as well as the decryption algorithm. The person skilled in the art knows the method from relevant publications, and the AES method is standardized.

From the master key MK, keys for cross-ECU functions ECUGK are further generated. These ECUGK keys are derived from the vehicle identification number VIN or FIN of the circle of trust. In contrast to the individual keys for control devices ECUIK, a cross-control device key ECUGK is distributed to several control devices and thus enables distributed functions to access the same key material. The cross-control device key ECUGK may thus be used for function-related protected communication within the vehicle, for example. The various key sets for the control devices may be made available in the backend server 320 in the form of download containers. If necessary, the vehicle will also download these download containers in encrypted form via a secure connection. This process will be shown in more detail in the following.

All data entry processes are booked in the backend server 320 and are therefore traceable. The backend holds a history of the built-in participants for each vehicle 10, which contains all the information needed to generate the keys contained in a participant. The data entry processes include both the initial data entry and multiple data entry, that is, re-entry of data of a vehicle that has already been supplied with data. Multiple data entry is necessary, for example, if a control device that has already been supplied with data needs to be replaced and is to be installed in another vehicle after repair. Another typical application relates to the sale of the vehicle in a different sales region that has different regulations for the allocation of the keys. The key derivation function model is assumed to be known. Reference is made to the solutions of the prior art already described in the introduction.

Figure 4:
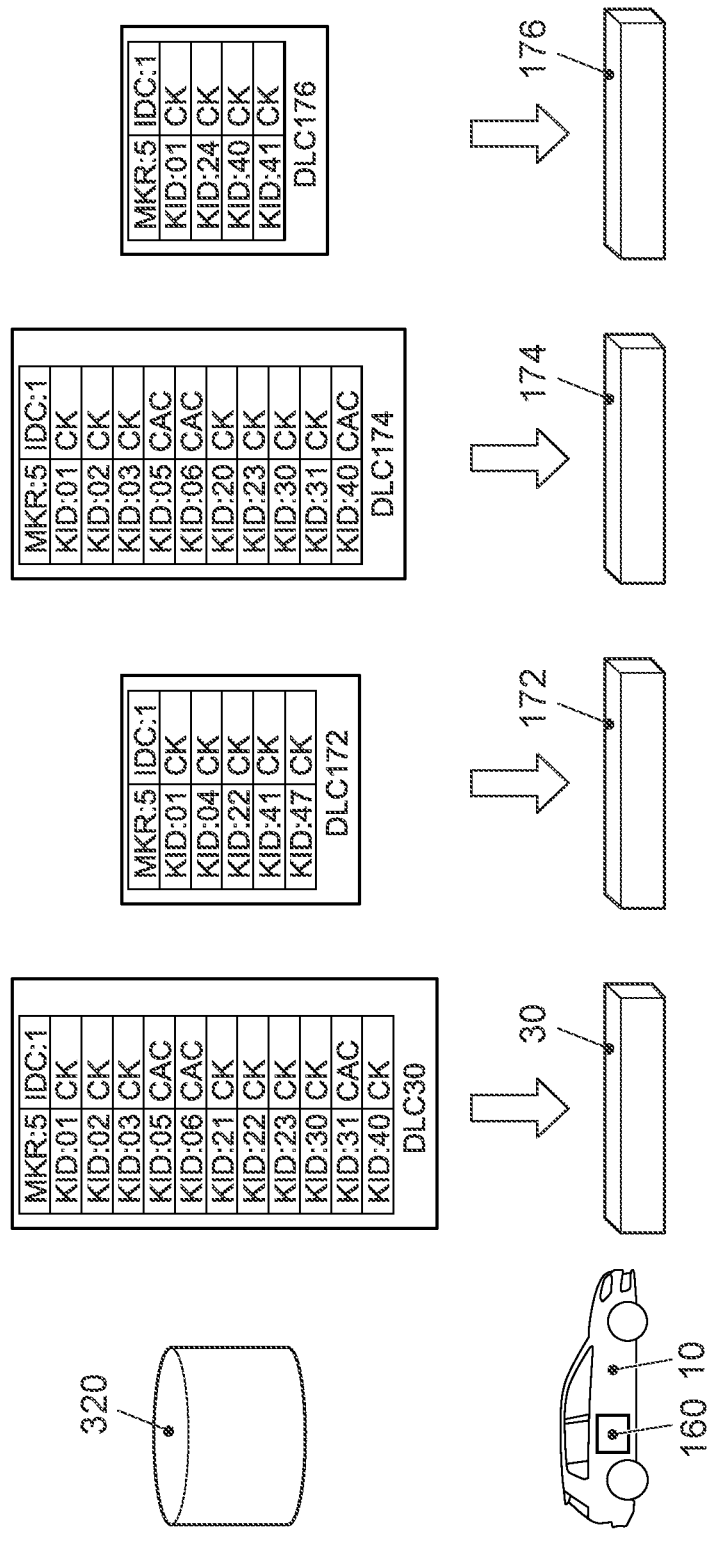
FIG. 4 shows a schematic representation of the data containers which are downloaded from a backend server in order to enter key renewals into a vehicle according to an embodiment.

The process of a key renewal of the control devices 30, 172, 174, 176 is shown in more detail in FIG. 4. This shows the download link containers (DLC) for control devices 30, 172, 174 and 176. As described, all keys in the backend server 320 are derived from the associated master key MK. This master key MK is not stored in the vehicle 10 even in the case of initial data entry. It is only made available to the backend servers 320 of the circle of trust and stored there securely. However, a master key reference MKR is assigned, which is entered in the download link containers for the control devices 30, 172, 174, 176. In addition, an identity counter reading IDC is entered, which indicates how often all keys of the control device have been updated. The derived cryptographic keys provided for the respective control device with their key type identifications KID are specified below in the download link containers. In the case of the master control device 30, the keys with the key type identifications 01, 02, 03, 05, 06, 21, 22, 23, 30, 31, 40 are listed. The meaning of the different key types is not explained in detail. In the control device 172, the keys of the key types 01, 04, 22, 41, 47 are listed. In the case of the control device 174, the keys of the key types 01, 02, 03, 05, 06, 20, 23, 30, 31, 40 are listed. In the control device 176, the keys of the key types 01, 24, 40, 41 are listed. In addition, the initial values of various key derivation parameters are listed in the download link containers.

These are the key derivation parameters listed in the DLC:

| Key derivation parameters | |
|---|---|
| Master key reference | MKR: 5 |
| Identity counter | IDC: 1 |
| Key type identification | KID |

The other key derivation parameters such as the key type learning counter and the need for renewal of the respective key were already saved during the initial data entry and do not change when the key renewal is shown.

The key type learning counter CKLC is used to specifically change individual keys. The key types to which a key type learning counter CKLC is assigned may have entries that differ from one another over time. By increasing the key type learning counter for a key type of a control device, the "same" key is also changed in the corresponding other control devices of the vehicle and its key type learning counter is increased accordingly by one. With the key derivation parameter need for renewal CKUR, when a control device of a vehicle is exchanged, all keys of the keys marked as requiring renewal, which were also renewed in the exchanged control device, are exchanged and their key type learning counter increases by one. This means that the same key also changes in the other control devices. This cancels out invasive attack scenarios in which the hardware of the control devices is destroyed in order to read the keys, as the keys become worthless afterwards as soon as the destroyed control device is replaced. In the case of the newly installed control device, the key-type learning counter is increased for the keys marked as requiring renewal, and this also replaces the corresponding keys of the control devices remaining in the vehicle, so that the old keys of the destroyed control device become worthless.

Figure 5:
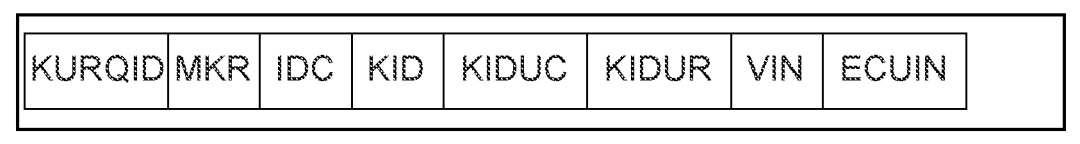

FIG. 5 shows the exemplary message format for a message that the vehicle 10 generates and sends to the backend server 320 via the communication circuit 160 in order to request a key renewal. This key renewal request message contains an identification KURQID for recognizing the key renewal request message. This is followed by the various key derivation parameters MKR, KID, CKLC, CKUR, VIN, and ECUIN. The key derivation parameters have the following meanings:

| | |
|---|---|
| MKR | master key reference |
| IDC | identity counter |
| KID | key type identification |
| CKLC | key type training counter |
| CKUR | key renewal |
| VIN | vehicle identification number |
| ECUIN | control device identification numbers |

The key renewal process functions in the following manner: The vehicle transmits its complete status, as shown in FIG. 5. This also includes the control device identification numbers ECUIN. The backend is informed about the status quo of the vehicle condition. It evaluates the information transmitted and then decides itself whether and which keys need to be renewed. For example, it recognizes from the changed control device identification number which control device has been replaced and recalculates the necessary cryptographic key.

The backend server 320 evaluates the entries in the key renewal request message and generates the requested key again. The derived keys are made available again in download link containers and transmitted to the vehicle 10 via secure communication.

The need to renew all keys of the vehicle may be recognized by the fact that a key renewal request message is received, whereby the status has not changed, i.e. no control device has been replaced, etc.

The disclosure is not restricted to the exemplary embodiments described here. There is room for various adaptations and modifications which those skilled in the art, based on their expert knowledge as well as belonging to the disclosure, would consider.

All examples mentioned herein as well as conditional formulations are to be understood without restriction to such specifically cited examples. For example, it will be appreciated by those skilled in the art that the block diagram presented herein is a conceptual view of exemplary circuitry. In a similar manner, it may be seen that a depicted flowchart, state transition diagram, pseudocode and the like represent different variants for the representation of processes that may essentially be stored in computer-readable media and thus executed by a computer or processor.

It should be understood that the proposed method and associated devices may be implemented in various forms of hardware, software, firmware, special purpose processors, or a combination thereof. Specialty processors may include application-specific integrated circuits (ASICs), reduced instruction set computers (RISC), and/or field programmable gate arrays (FPGAs). The proposed method and the device are for example implemented as a combination of hardware and software. The software may be installed as an application program on a program storage device. Typically, it is a computer platform-based machine that includes hardware such as one or more central processing units (CPU), random access memory (RAM), and one or more input/output (I/O) interfaces. An operating system is also typically installed on the computer platform. The various processes and functions described here may be part of the application program or a part that is executed by the operating system.

LIST OF REFERENCE NUMERALS

10 vehicle
18 administrative unit
20 touch-sensitive display unit
30 gateway 40 arithmetic unit
50 input unit
60 storage unit
70 data line to the display unit
80 data line to the storage unit
90 data line to input unit
100 1st data bus
102 2nd data bus
104 3rd data bus
106 4th data bus
110 instrument cluster
120 phone
130 navigation device
140 radio
150 camera
160 communication circuit
172 engine control device
174 ESP control device
176 transmission control device
182 distance control device
184 landing gear control device
190 on-board diagnostic connector
200 Evolved Packet Core
210 cellular base station
300 internet
310 road-side unit
320 backend server
CCK communication key
CKLC key type training counter
CKUR key renewal
CMK communication master key
ECUIK control device-individual key
ECUGK cross-ECU key
IK initial key
KID key type identification
MK master key
MKR master key reference In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for generating cryptographic keys according to a key derivation function model comprising:
   defining a master key for a model selected from different models of a product type of a manufacturer;
   defining a set of key derivation parameters for the key derivation function model;
   determining the key derivation parameters for the model for which a cryptographic key is to be derived;
   deriving an individual cryptographic key or a set of cryptographic keys from the master key according to the key derivation function model using the key derivation parameters; wherein
   the step of defining a set of key derivation parameters comprises at least the parameters key type identification and key type learning counter; wherein
   a key type, identified by the key type identification, indicates at least a derivation path for a key.

2. The method of claim 1, wherein the step of defining a set of key derivation parameters further comprises one or more of the following key derivation parameters: serial number of the product type, need of one or more keys to be renewed, and identity counter.

3. The method of claim 1, wherein a reference to the master key, from which the cryptographic keys are derived, is stored in the product.

4. The method of claim 1, wherein the product is a vehicle comprising a number of control devices and that a control device identification number is entered as a further key derivation parameter into the key derivation.

5. The method of claim 4, wherein the master keys for the vehicles of a manufacturer differ according to one or more of the criteria: vehicle brand, vehicle model, year of manufacture, and distribution country.

6. The method of claim 3, wherein the key derivation takes place in a backend server of a crypto service provider or of the manufacturer and that the derived key or the set of derived keys together with the master key reference and the identity counter is made available to the product via download link container.

7. The method of claim 6, wherein separate download link containers are made available for different control devices of the product.

8. The method of claim 1, wherein the cryptographic keys are derived for each vehicle using the vehicle identification number (VIN).

9. The method of claim 5, wherein the properties of the key and the derivation path are determined by the key type identified by the key type identification.

10. A device for generating cryptographic keys, wherein the device comprises a key derivation circuit by which a derivation of the cryptographic key from a stored master key is performed, which stored master key is selected in a received message by a master key reference specified therein, wherein the key derivation is carried out according to a key derivation function model in which a set of key derivation parameters is received, which includes at least the key derivation parameters key type identification and key type learn counter; wherein
   a key type, identified by the key type identification indicates at least a derivation path for a key.

11. The device of claim 10, wherein the device is further configured such that one or more of the following key derivation parameters are used for key derivation and are entered into the key derivation model: serial number of the product type, need of one or more keys to be renewed, and identity counter.

12. A vehicle comprising at least:
   a processor, wherein the processor has a protected memory area in a memory in which at least one cryptographic key is stored, which processor has another memory area in which at least one master key reference and a set of key derivation parameters with at least one identity counter reading relating to a state of the keys of the vehicle are stored; and
   a communication circuit by which the master key reference stored in the memory area and at least one stored key derivation parameter set may be transmitted to a device for generating cryptographic keys; wherein
   the key derivation parameter set comprises at least the parameters key type identification and key type learning counter; wherein a key type, identified by the key type identification, indicates at least a derivation path for a key.

13. The vehicle of claim 12, wherein further key derivation parameters are stored in the memory area, comprising at least one or more of following the key derivation parameters: serial number of the product type, need of one or more keys to be renewed, and identity counter.

14. The method of claim 2, wherein a reference to the master key, from which the cryptographic keys are derived, is stored in the product.

15. The method of claim 2, wherein the product is a vehicle comprising a number of control devices and that a control device identification number is entered as a further key derivation parameter into the key derivation.

16. The method of claim 3, wherein the product is a vehicle comprising a number of control devices and that a control device identification number is entered as a further key derivation parameter into the key derivation.

17. The method of claim 4, wherein the key derivation takes place in a backend server of a crypto service provider or of the manufacturer and that the derived key or the set of derived keys together with the master key reference and the identity counter is made available to the product via download link container.

18. The method of claim 5, wherein the key derivation takes place in a backend server of a crypto service provider or of the manufacturer and that the derived key or the set of derived keys together with the master key reference and the identity counter is made available to the product via download link container.

19. The method of claim 2, wherein the cryptographic keys are derived for each vehicle using the vehicle identification number (VIN).

20. The method of claim 1, further comprising changing a key in case the key type learning counter is increased.

* * * * *